United States Patent
Gowan et al.

(10) Patent No.: US 6,704,634 B1
(45) Date of Patent: Mar. 9, 2004

(54) GEAR RETRACT BRAKING SYSTEM AND METHOD

(75) Inventors: John J. Gowan, Mountlake Terrace, WA (US); Scott D. Maxwell, Renton, WA (US); Tu-Luc H. Nguyen, Bellevue, WA (US); Beth L. Sundquist, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/289,472

(22) Filed: Nov. 6, 2002

(51) Int. Cl.[7] .......................... F16D 66/00; B64C 25/12
(52) U.S. Cl. ................. 701/70; 244/100 R; 244/102 R; 244/50; 340/960; 340/331; 340/970
(58) Field of Search ................. 701/70; 188/1.11; 244/100 R, 102 R, 103 R, 202, 102 A, 102 SL, 50; 303/100, 112; 340/470, 960, 331, 959, 679, 970

(56) References Cited

U.S. PATENT DOCUMENTS

| 4,822,113 | A | * | 4/1989 | Amberg et al. | ............. 303/100 |
|---|---|---|---|---|---|
| 5,333,816 | A | * | 8/1994 | Del Monte | ................... 244/50 |
| 5,721,487 | A | * | 2/1998 | Milosevic | .............. 324/207.26 |
| 5,745,053 | A | * | 4/1998 | Fleming, III | ................ 340/970 |
| 5,955,972 | A | * | 9/1999 | Wade | .......................... 340/960 |
| 6,237,406 | B1 | * | 5/2001 | Nance | ....................... 73/178 T |
| 6,262,720 | B1 | * | 7/2001 | Jeffrey et al. | ................ 345/326 |
| 6,464,168 | B1 | * | 10/2002 | Swannell et al. | ........ 244/102 A |
| 2002/0056786 | A1 | * | 5/2002 | Grossman | ............... 244/102 R |
| 2002/0057012 | A1 | * | 5/2002 | Bourguet et al. | ......... 303/113.1 |
| 2003/0011493 | A1 | * | 1/2003 | Wiplinger | .................... 340/960 |
| 2003/0033927 | A1 | * | 2/2003 | Bryant et al. | .................. 91/471 |
| 2003/0102191 | A1 | * | 6/2003 | DeVlieg | ............... 188/1.11 W |

* cited by examiner

Primary Examiner—Thomas G. Black
Assistant Examiner—Tuan C To
(74) Attorney, Agent, or Firm—Black Lowe & Graham PLLC

(57) ABSTRACT

A method and system for braking aircraft landing gear wheels after initialization of landing gear retraction. The system includes monitors, controlling components, measurement components, a fault recording memory, fault annunciation components, wheel braking system and brakes. The monitors monitor speed of the landing gear wheels and landing gear position. The control component generates braking instructions based on the monitored speed of the wheels and position of the landing gear.

19 Claims, 7 Drawing Sheets

GEAR RETRACT BRAKING SYSTEM AND METHOD

FIELD OF THE INVENTION

This invention relates generally to aircraft systems and, more specifically, to aircraft braking systems.

BACKGROUND OF THE INVENTION

After takeoff, the landing gear of an aircraft is retracted as soon as possible. In order to safely stow the landing gear in the fuselage, the wheel speed must be zero (not spinning). Otherwise, damage can occur to components, such as hydraulic lines, within the landing gear bay. This is of special concern when a spinning wheel has shredded. For example, tread rotating with a failed tire can potentially damage flight equipment when the rotating, failed tire enters the wheel well.

Presently wheel braking during landing gear retraction is a passive non-monitored function. That is, the flight crew has no way of knowing if the wheels are spinning while being retracted. Thus, the flight crew does not have the ability to stop gear retraction if the wheels are spinning. Therefore, there exists a need to ensure that wheels are not spinning before the landing gear is fully retracted.

SUMMARY OF THE INVENTION

The present invention is a method and system for braking aircraft landing gear wheels after initialization of landing gear retraction. The system takes advantage of existing physical components of a brake control system. Thus very little new hardware needs to be added to accomplish the functionality of the present invention. The present invention is an active control system. The Brake Metering Valves in an airplane can be made "less costly", "less complex" and "lighter" by elimination of the existing gear retract function. Gear retraction is made "more safe" because the threat from a flailing tire tread is greatly reduced. The braking system formed in accordance with the present invention reliably stops tire rotation before a failed tire can enter the wheel well where a tread rotating with the tire can potentially damage combinations of flight critical equipment.

An embodiment of the system includes monitors, controlling components, measurement components, a fault recording memory, fault annunciation components, wheel braking system and brakes. The monitors monitor speed of the landing gear wheels and landing gear position. The control component generates braking instructions based on the monitored speed of the wheels and position of the landing gear. The measurement components provide indications proportional to wheel speed and landing gear position. The fault recording memory records incidents of wheels spinning above a threshold when the landing gear position is at a given threshold. The braking system component applies brake pressure according to the generated braking instructions.

The generated braking instructions suitably include instructions to implement wheel braking with onset of gear retraction, increase braking if the landing gear position is at least to a threshold position and wheel speed is greater than a speed threshold value.

The system also includes a component for alerting the flight crew, if the landing gear position is at least to a threshold position and wheel speed is greater than a speed threshold value.

The system includes a component for inhibiting landing gear retraction, if the landing gear position is at least to a threshold position and wheel speed is greater than a speed threshold value.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
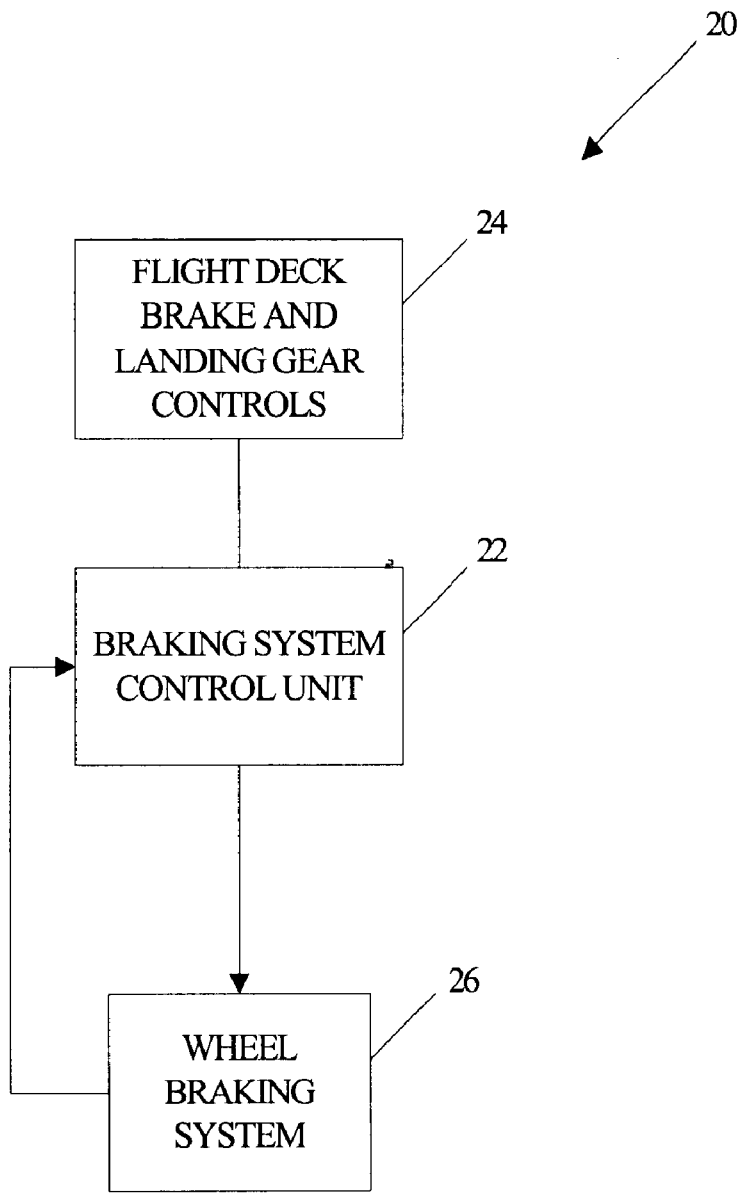
FIG. 1 illustrates an example system block diagram formed in accordance with the present invention.

FIG. 1 illustrates an exemplary system 20 for monitoring and braking landing gear of an aircraft during retraction based on the monitored condition of the landing gear. The system 20 includes a braking system control unit 22, which is electrically coupled to Flight Deck Brake and Landing Gear Controls 24, and a wheel braking system 26. The wheel braking system 26 suitably includes wheel brakes (not shown), electrical or hydraulic components (not shown), wheel speed monitoring devices (not shown), and landing gear position monitoring devices (not shown). The braking system control unit 22 is suitably a software and/or hardware computer-based system that analyzes signals received from the wheel braking system 26 and the Flight Deck Brake and Landing Gear Controls 24 to generate instructions (signals) for the wheel braking system 26 and provide any necessary feedback to the flight crew through the Flight Deck Brake and Landing Gear Controls 24. The Flight Deck Brake and Landing Gear Controls 24 include a landing gear control (e.g. lever) (not shown), and alerting components (not shown), such as visual or audible warning units.

When the braking system control unit 22 receives a landing gear up command from the Flight Deck Brake and Landing Gear Controls 24 (i.e., landing gear control), the landing gear actuation system begins gear retraction and the braking system control unit 22 receives landing gear position monitored information and wheel speed information from the wheel braking system 26. Based on the received monitored position, the braking system control unit 22 determines whether landing gear retraction is progressing successfully or there exists a problem—such as the wheels not slowing down adequately with respect to the monitored landing gear position information. If the landing gear retraction and braking are not progressing satisfactorily, the braking system control unit 22 instructs the wheel braking system 26 to increase wheel braking and/or alerts the flight crew of the situation and/or inhibits landing gear retraction until wheel speed is at zero for safe retraction. Also incidents of problems noted above will be recorded in memory for later retrieval within the brake control unit 22 BITE (built in test equipment).

Figure 2:
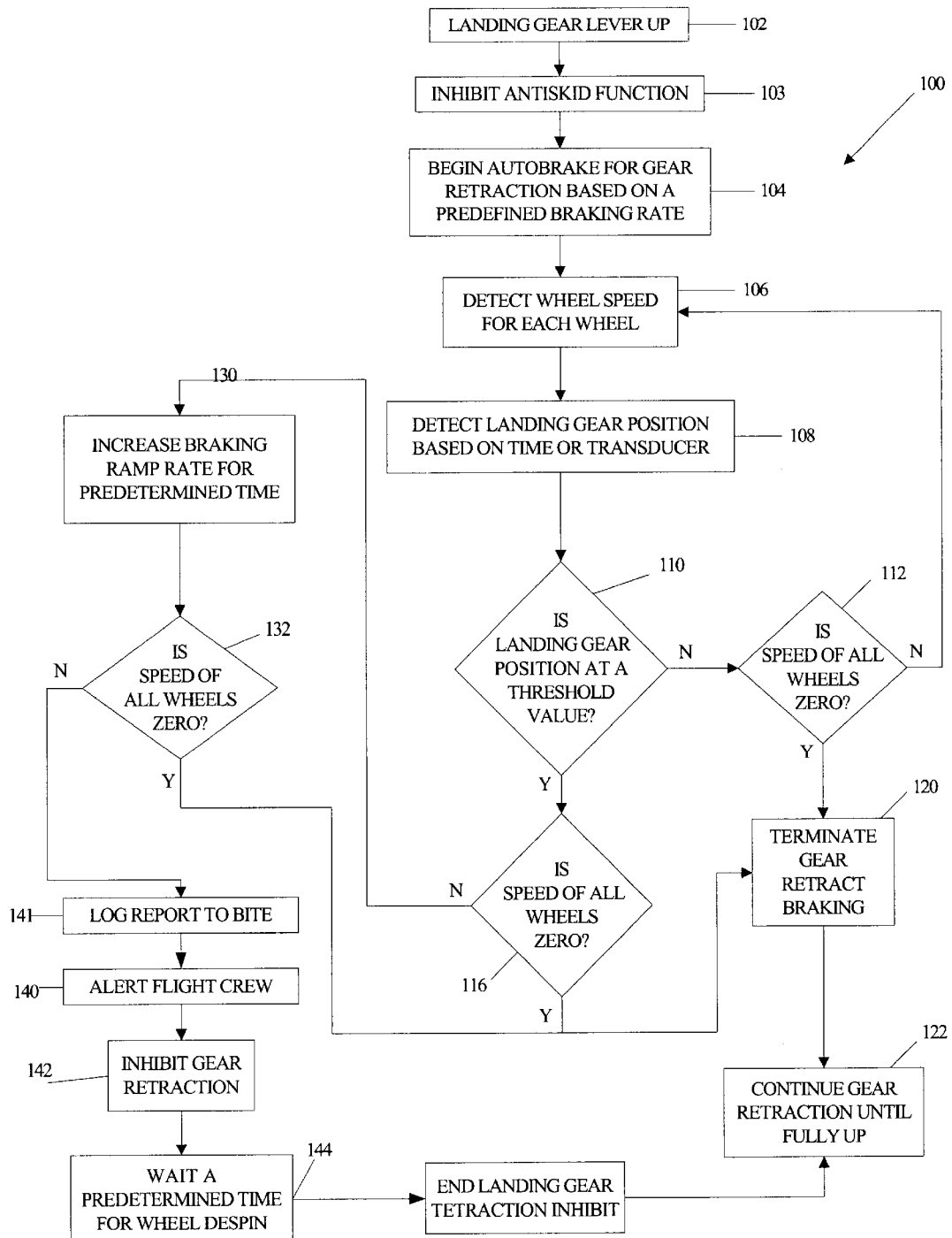
FIG. 2 illustrates a flow diagram performed by the example system shown in FIG. 1.

FIG. 2 illustrates an exemplary process 100 that is performed by the braking system control unit 22 shown in FIG. 1. First, at a block 102, the process 100 begins when the landing gear lever is moved to the up position after take-off. Next, at a block 103, the wheel brake system 26 inhibits antiskid function and at a block 104 begins auto-braking of the wheels of the landing gear based on a predefined braking ramp rate.

At approximately the same time, landing gear retraction begins. The predefined braking ramp rate is a schedule of increased brake pressure applied in order to stop wheel rotation by a certain time from the beginning of the braking. The time relates to gear retraction speed. At a block 106, the wheel speed for each wheel is detected by the wheel brake system 26 (wheel speed monitoring devices) and sent to the braking system control unit 22. At a block 108, the wheel brake system 26 determines landing gear position based on time since the start of gear retraction or a signal from a landing gear position monitoring device, such as a linear or rotary variable differential transformer. The determined landing gear position is sent to or generated in (when time is used) the braking system control unit 22. Next, at a decision block 110, the braking system control unit 22 determines if the landing gear position is at a threshold value. The threshold value is a retract position of the landing gear where wheel speed should be zero before further retraction occurs. If, at the decision block 110, the landing gear position is not at the threshold value, at a decision block 112 the braking system control unit 22 determines if the speed of all the wheels is zero. If the speed of all the wheels is not zero, the process returns to the block 106. If the speed of all the wheels is zero, as determined at the decision block 112, at a block 120 the braking system control unit 22 terminates gear braking.

If the landing gear is determined to be at the threshold value, as determined at the decision block 110, at a decision block 116 the braking system control unit 22 again checks the speed of all the wheels. If the speed of all the wheels is zero, at the block 120 the braking system control unit 22 terminates gear braking. After gear braking is terminated, at the block 120, at a block 122, gear retraction continues until the gear is fully up. If, at the decision block 116 not all the wheels are at zero speed, at a block 130 the braking system control unit 22 instructs the wheel braking system 26 to increase braking for a predetermined period of time. After the predetermined period of time, the braking system control unit 22 checks the speed of the wheels at a decision block 132. If at the decision block 132 the wheel speed is at zero, the process continues to the block 120 where gear braking is terminated and gear retraction continues at the block 122. If at the decision block 132, some speed still remains on one or more of the wheels, a fault is generated and recorded in BITE (built in test equipment memory) block 141 within the braking system control unit 22 and the braking system control unit 22 alerts the flight crew at a block 140 and inhibits gear retraction at a block 142. At a block 144, after a predetermined period of time has expired in order to allow for the wheels to reach zero speed, gear retraction inhibit is ended at block 143 and the process continues to the block 122 for full gear retraction.

In an alternate embodiment, increased braking that is shown at the block 130 does not occur. Instead, the process 100 goes directly from the decision block 116 to generating and recording a fault to BITE at block 141 and alerting the flight crew at the block 140. This embodiment does not include block 142, 144 . . . etc.

Because the present invention performs active monitoring and control of wheel braking during retraction, the valve and hydraulic structure for the braking system can be designed in various ways, such as shown in FIGS. 3–7 below. In all of the following examples, the Brake System Control Unit is electrically coupled to wheel speed monitors, landing gear position monitors and flight deck brake and landing gear controls.

Figure 3:
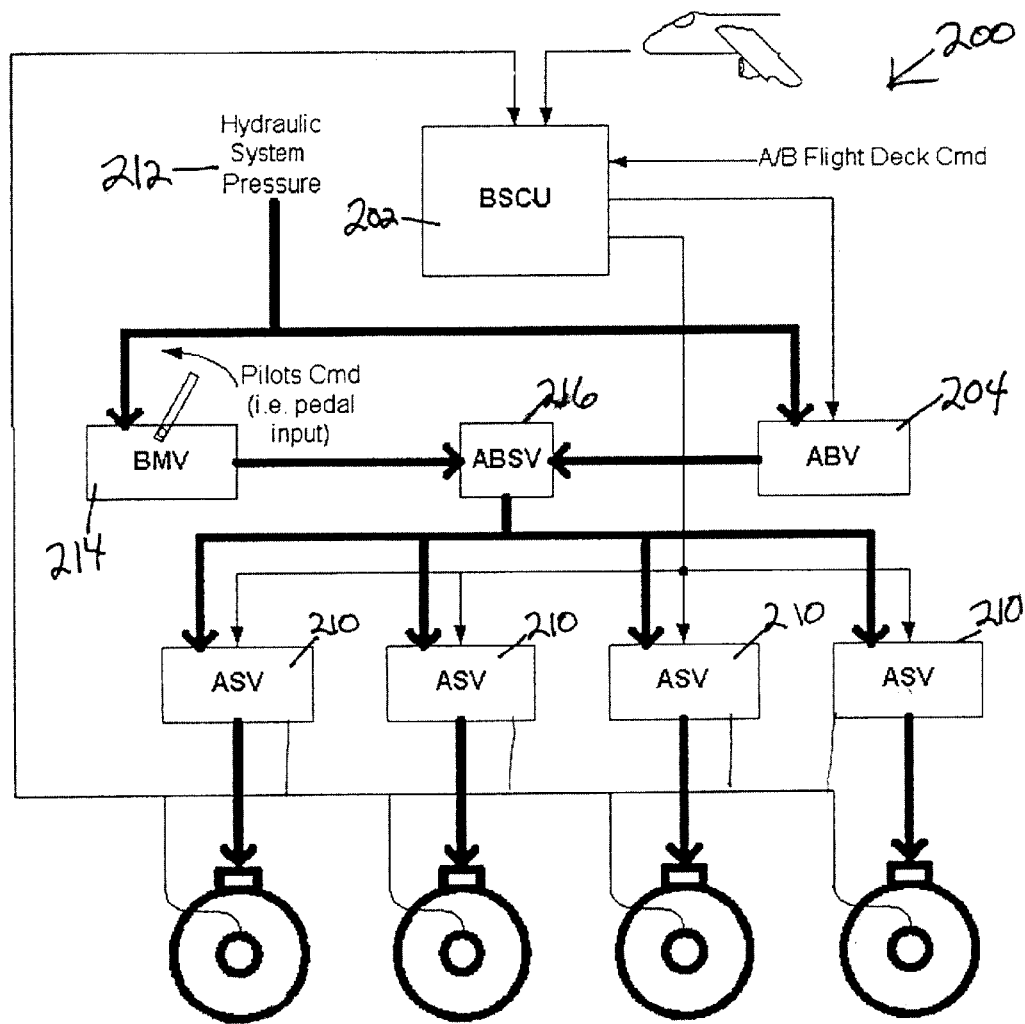
FIGS. 3–7 illustrate example embodiments of the present invention.

FIG. 3 illustrates a first exemplary braking system 200. A Brake System Control Unit 202 is electrically coupled to an Autobrake Valve 204 and Antiskid Valves 210. The braking system 200 includes a hydraulic pressure source 212 that is coupled to a Brake Metering Valve 214 and the Autobrake Valve 204. The Autobrake Valve 204 is hydraulically coupled to a Autobrake Shuttle Valve 216. The Autobrake Shuttle Valve 216 is hydraulically coupled to the Antiskid Valves 210. The Antiskid Valves 210 are hydraulically coupled to the brakes of the wheels.

Figure 4:
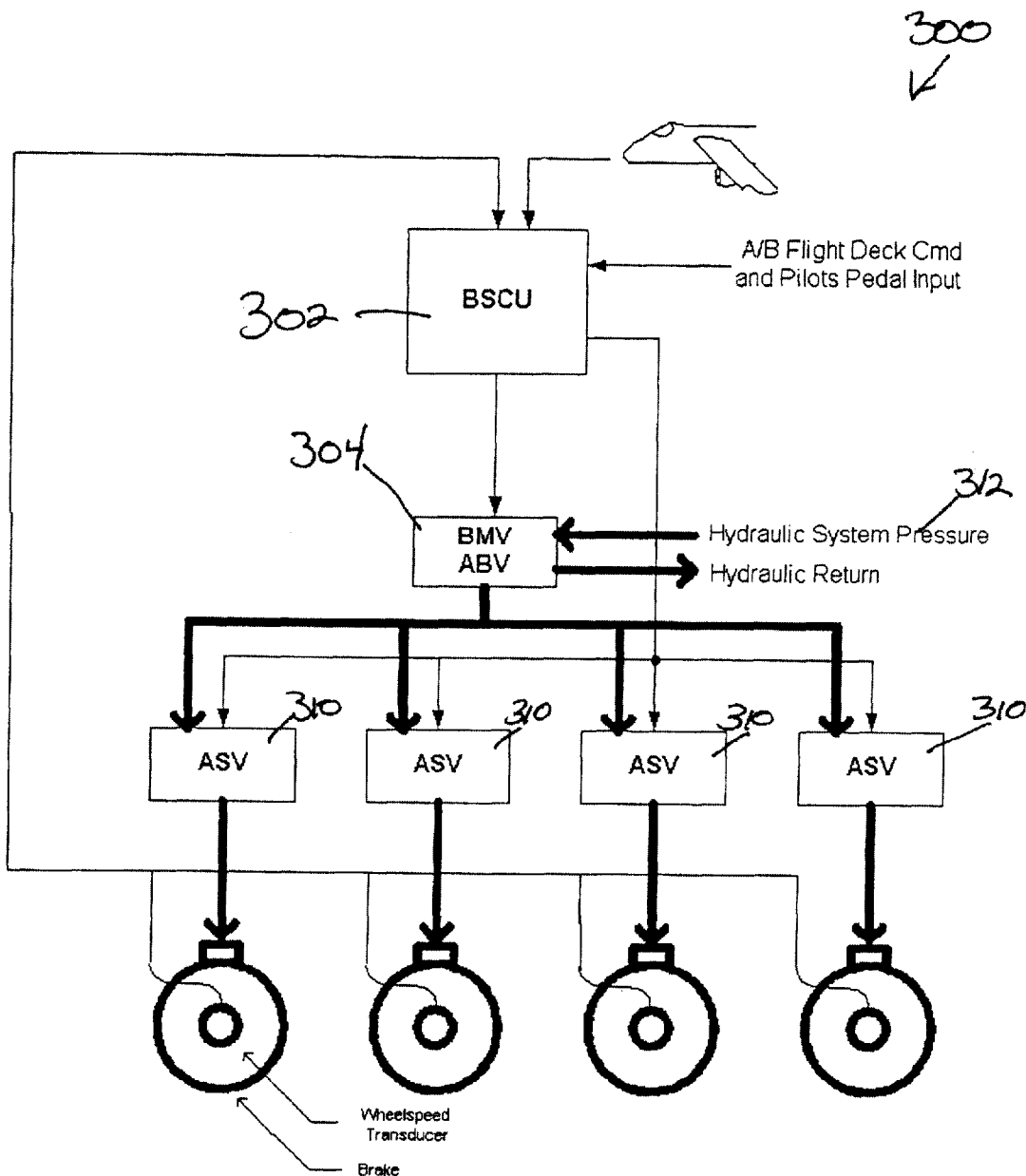

FIG. 4 illustrates a second exemplary braking system 300. A Brake System Control Unit 302 is electrically coupled to an Autobrake/Brake Metering Valve 304, wherein an associated control signal is the mathematically summed resultant of the autobrake and brake metering functions and Antiskid Valves 310. The braking system 300 includes a hydraulic pressure source 312 that is coupled to the Autobrake/Brake Metering Valve 304. The Autobrake/Brake Metering Valve 304 is hydraulically coupled to Antiskid Valves 310. The Antiskid Valves 310 are hydraulically coupled to the brakes of the wheels.

Figure 5:
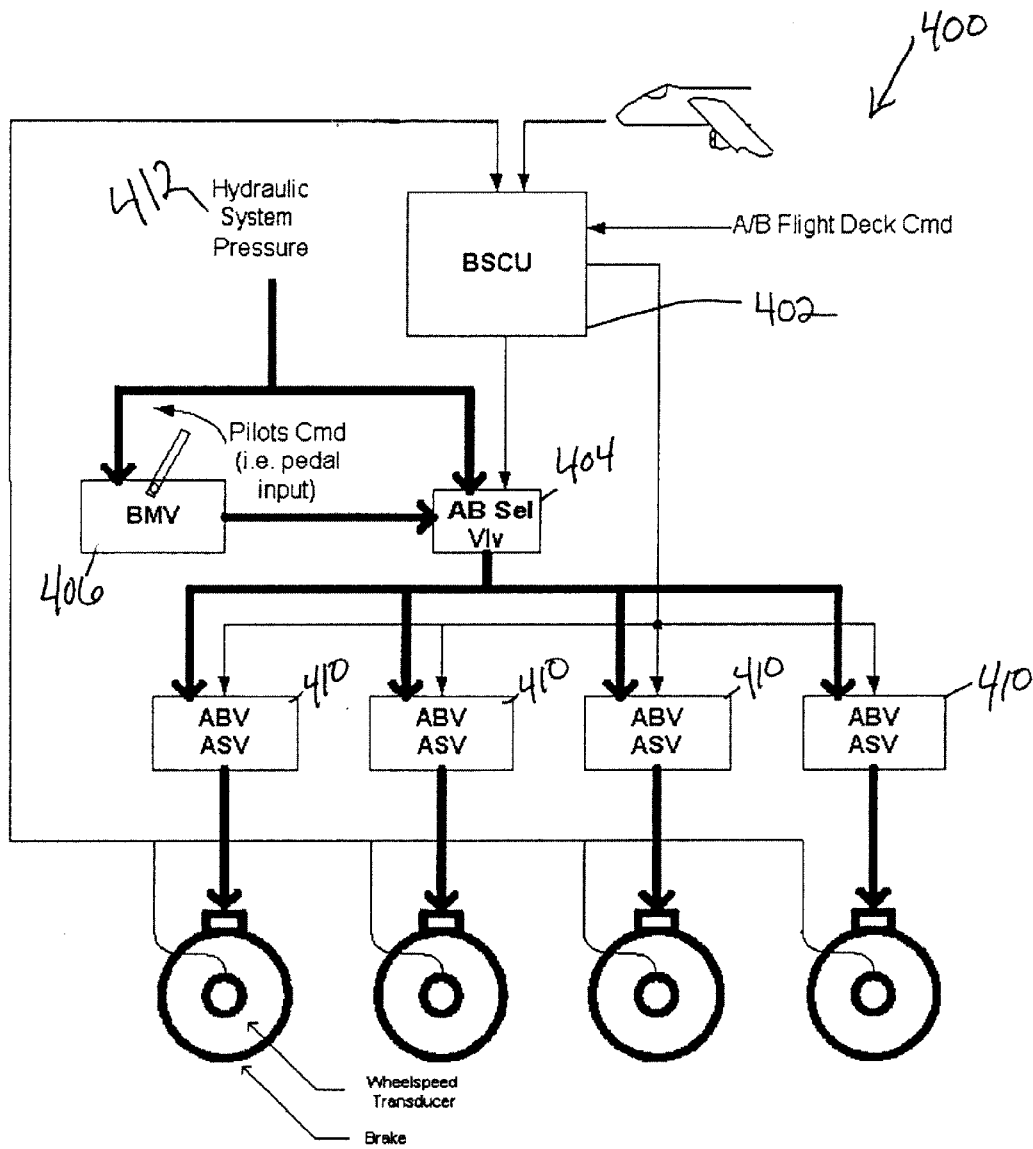

FIG. 5 illustrates a third exemplary braking system 400. A Brake System Control Unit 402 is electrically coupled to an Autobrake Selector Valve 404 and Autobrake/Antiskid Valves 410, wherein an associated control signal is the mathematically summed resultant of the autobrake and antiskid functions. The braking system 400 includes a hydraulic pressure source 412 that is coupled to a Brake Metering Valve 406 and the Autobrake Selector Valve 404. The Brake Metering Valve 406 is hydraulically coupled to the Autobrake Selector Valve 404. The Autobrake Selector Valve 404 is hydraulically coupled to the Autobrake/Antiskid Valves 410. The Autobrake/Antiskid Valves 410 are hydraulically coupled to the brakes of the wheels.

Figure 6:
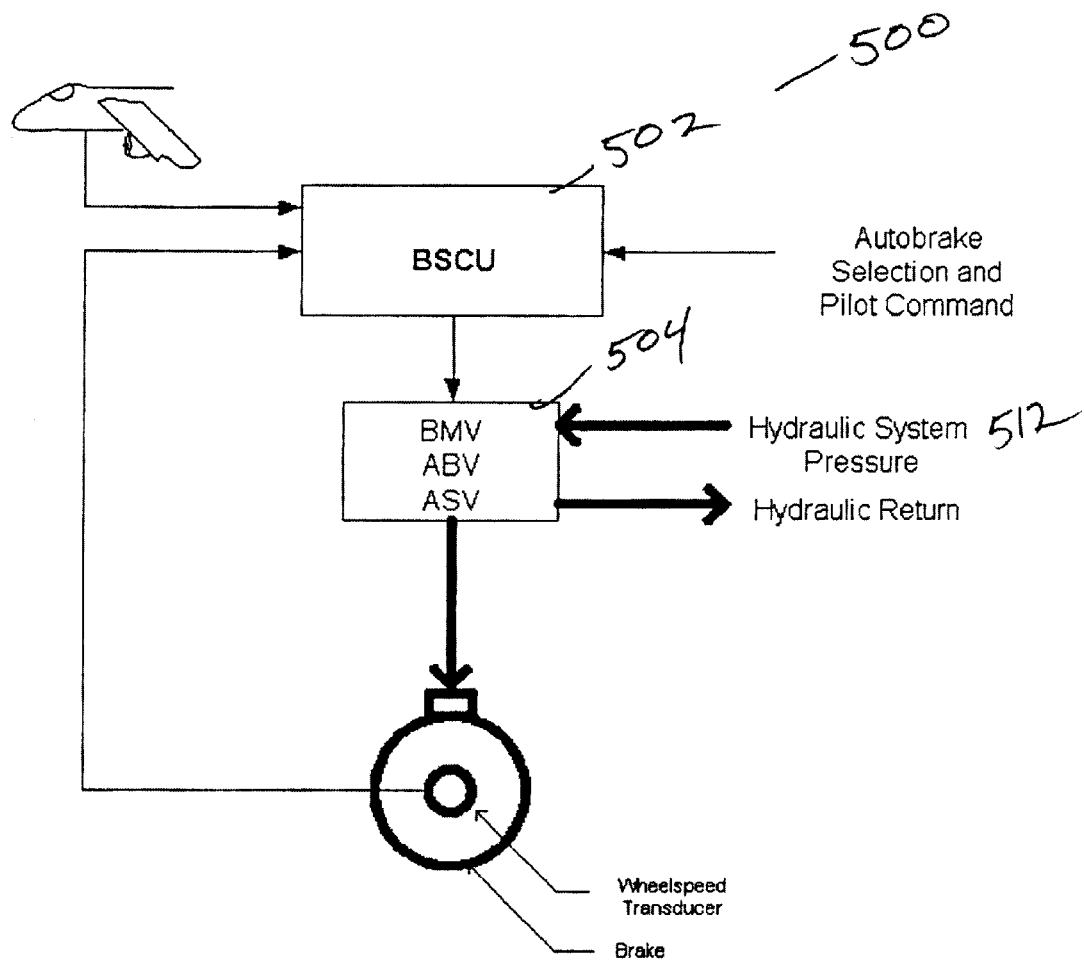

FIG. 6 illustrates a fourth exemplary braking system 500. A Brake System Control Unit 502 is electrically coupled to a Brake Metering/Autobrake/Antiskid Valves 504. The braking system 500 includes a hydraulic pressure source 512 that is coupled to the Brake Metering/Autobrake/Antiskid Valves 504, wherein an associated control signal is the mathematically summed resultant of the Brake Metering/Autobrake/Antiskid functions. The Brake Metering/Autobrake/Antiskid Valves 504 are hydraulically coupled to the brakes of the wheels.

Figure 7:
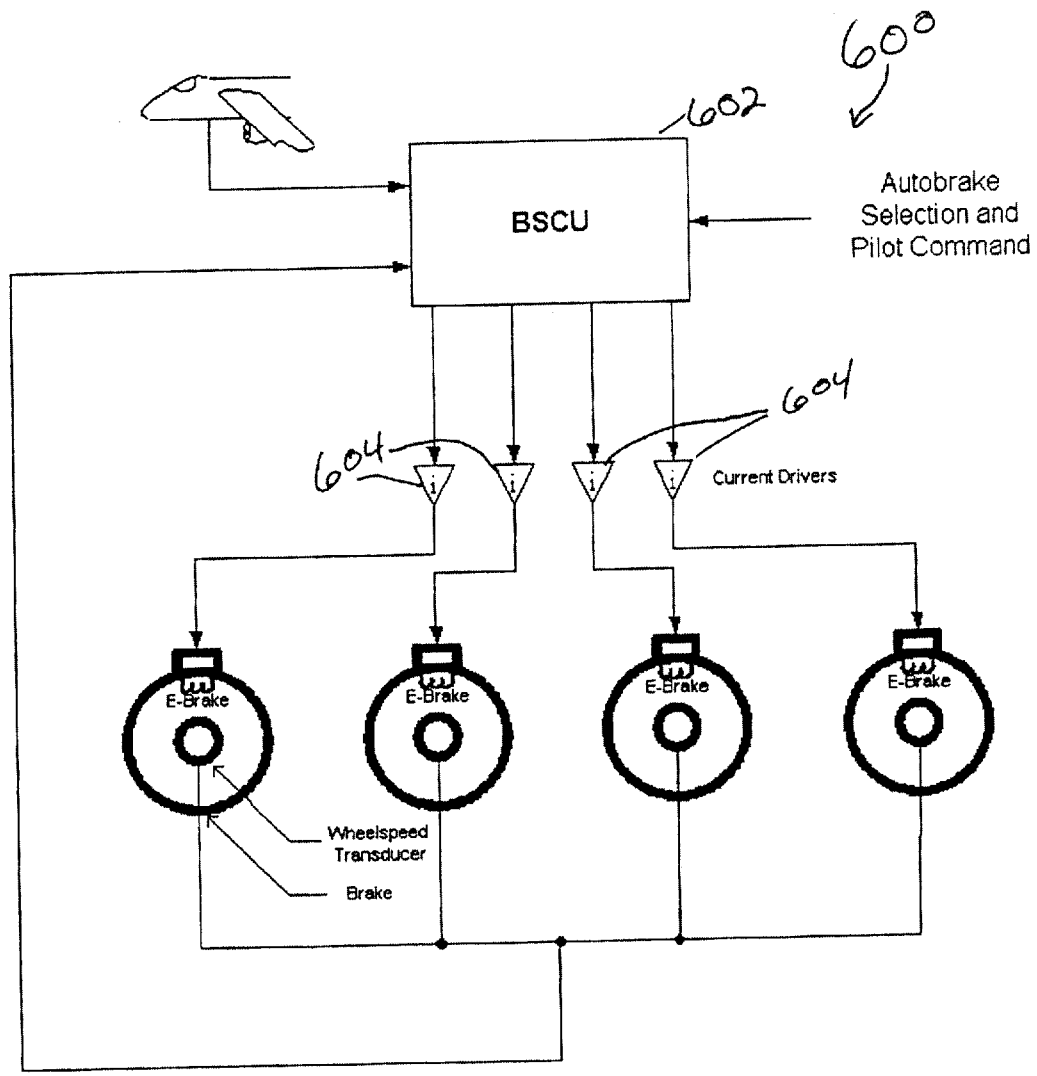

FIG. 7 illustrates a fifth exemplary braking system 600. A Brake System Control Unit 502 is electrically coupled to current drivers 604. The current drivers 604 are electrically coupled to electric wheel brakes.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for braking aircraft landing gear wheels after initialization of landing gear retraction, the method comprising:

monitoring flight deck brake controls and landing gear controls;

monitoring landing gear wheel speed;

monitoring landing gear position; and braking the landing gear wheels based on the monitored speed of the landing gear wheels and the monitored position of the landing gear.

2. The method of claim 1, wherein braking includes increasing braking, when the monitored landing gear position is at least to a threshold position and the monitored landing gear wheel speed is greater than a speed threshold value.

3. The method of claim 2, wherein the speed threshold value is zero.

4. The method of claim 1, further comprising alerting a flight crew, when the monitored landing gear position is at least to a threshold position and the monitored landing gear wheel speed is greater than a speed threshold value.

5. The method of claim 1, further comprising inhibiting landing gear retraction, when the monitored landing gear position is at least to a threshold position and the monitored landing gear wheel speed is greater than a speed threshold value.

6. The method of claim 1, further comprising recording faults generated as a result of wheel speed being above a threshold while the landing gear has reached a position threshold.

7. A method for braking aircraft landing gear wheels after initialization of landing gear retraction, the method comprising:
   monitoring flight deck brake and landing gear controls;
   monitoring landing gear wheel speed;
   monitoring landing gear position; and
   alerting a flight crew, when the monitored landing gear position is at least to a threshold position and the monitored landing gear wheel speed is greater than a speed threshold value.

8. A landing gear braking system for braking aircraft landing gear wheels after initialization of landing gear retraction, the system comprising:
   monitors for flight deck brake controls and landing gear controls;
   monitors for monitoring speed of the landing gear wheels and landing gear position;
   a control component for generating braking instructions based on the monitored speed of the landing gear wheels and the monitored position of the landing gear; and
   a braking component for braking the landing gear wheels according to the generated braking instructions.

9. The system of claim 8, wherein the generated braking instructions include instructions to increase braking, when the monitored landing gear position is at least to a threshold position and the monitored landing gear wheel speed is greater than a speed threshold value.

10. The system of claim 9, wherein the speed threshold value is zero.

11. The system of claim 8, further comprising:
    a crew alerting device for alerting the flight crew, when the monitored landing gear position is at least to a threshold position and the monitored landing gear wheel speed is greater than a speed threshold value.

12. The system of claim 8, further comprising:
    a component for inhibiting landing gear retraction, when the monitored landing gear position is at least to a threshold position and the monitored landing gear wheel speed is greater than a speed threshold value.

13. The system of claim 8, further comprising:
    a component for recording faults generated as a result of wheel speed being above a threshold while the landing gear has reached a position threshold.

14. A landing gear braking system for braking aircraft landing gear wheels after initialization of landing gear retraction, the system comprising:

monitors for flight deck brake and landing gear controls;
monitors for monitoring speed of the landing gear wheels and landing gear position;
a crew alerting device for alerting the flight crew, when the monitored landing gear position is at least to a threshold position and the monitored landing gear wheel speed is greater than a speed threshold value,
a memory for recording faults generated when landing gear position has reached a predefined threshold and wheel speed is above a predefined threshold.

15. A landing gear braking system comprising:
landing gear including wheels and brakes;
landing gear wheel speed monitors for monitoring landing gear wheel speed;
landing gear position monitors for monitoring landing gear position;
flight deck brake control and landing gear control monitors;
memory for recording faults generated when landing gear position has reached a predefined threshold and wheel speed is above a predefined threshold;
a brake control unit for generating braking instructions based on the monitored speed of the landing gear wheels and the monitored position of the landing gear;
an autobrake valve electrically coupled to the brake control unit for receiving the generated braking instructions;
one or more antiskid valves electrically coupled to the brake control unit for receiving the generated braking instructions and hydraulically coupled to the brakes;
an autobrake shuttle valve hydraulically coupled to the one or more antiskid valves and the autobrake valve; and
a brake metering valve hydraulically coupled to the autobrake shuttle valve, wherein the brake metering valve overrides the autobrake valve when actuated.

16. A landing gear braking system comprising:
landing gear including wheels and brakes;
landing gear wheel speed monitors for monitoring landing gear wheel speed;
landing gear position monitors for monitoring landing gear position;
flight deck brake control and landing gear control monitors;
memory for recording faults generated when landing gear position has reached a predefined threshold and wheel speed is above a predefined threshold;
a brake control unit for generating braking instructions based on the monitored speed of the landing gear wheels and the monitored position of the landing gear;
one or more brake metering/autobrake valves electrically coupled to the brake control unit for receiving the generated braking instructions; and
one or more antiskid valves electrically coupled to the brake control unit for receiving the generated braking instructions and hydraulically coupled to the one or more brake metering/autobrake valves and the brakes.

17. A landing gear braking system comprising:
landing gear including wheels and brakes;
landing gear wheel speed monitors for monitoring landing gear wheel speed;
landing gear position monitors for monitoring landing gear position;

flight deck brake control and landing gear control monitors;

memory for recording faults generated when landing gear position has reached a predefined threshold and wheel speed is above a predefined threshold;

a brake control unit for generating braking instructions based on the monitored speed of the landing gear wheels and the monitored position of the landing gear;

an autobrake selector valve electrically coupled to the brake control unit for receiving the generated braking instructions;

one or more autobrake/antiskid valves electrically coupled to the brake control unit for receiving the generated braking instructions and hydraulically coupled to the autobrake selector valve and brakes;

a brake metering valve hydraulically coupled to the autobrake selector valve.

18. A landing gear braking system comprising:

landing gear including wheels and brakes;

landing gear wheel speed monitors for monitoring landing gear wheel speed;

landing gear position monitors for monitoring landing gear position;

flight deck brake control and landing gear control monitors; memory for recording faults generated when landing gear position has reached a predefined threshold and wheel speed is above a predefined threshold;

a brake control unit for generating braking instructions based on the monitored speed of the landing gear wheels and the monitored position of the landing gear; and one or more brake metering/autobrake/antiskid valves electrically coupled to the brake control unit for receiving the generated braking instructions and hydraulically coupled to the brakes.

19. A landing gear braking system comprising:

landing gear including wheels and electric brakes;

landing gear wheel speed monitors for monitoring landing gear wheel speed;

landing gear position monitors for monitoring landing gear position;

flight deck brake control and landing gear control monitors;

memory for recording faults generated when landing gear position has reached a predefined threshold and wheel speed is above a predefined threshold;

a brake control unit for generating braking instructions based on the monitored speed of the landing gear wheels and the monitored position of the landing gear; and one or more current drivers electrically coupled to the brake control unit and to the electric brakes.

* * * * *